United States Patent
Sinha et al.

(10) Patent No.: US 11,055,221 B2
(45) Date of Patent: Jul. 6, 2021

(54) SPECULATIVE DRAM READ, IN PARALLEL WITH CACHE LEVEL SEARCH, LEVERAGING INTERCONNECT DIRECTORY

(71) Applicant: Samsung Electronics Co., Ltd., Suwon-si (KR)

(72) Inventors: Vikas Sinha, Austin, TX (US); Hien Le, Cedar Park, TX (US); Tarun Nakra, Austin, TX (US); Yingying Tian, Austin, TX (US); Apurva Patel, Austin, TX (US); Omar Torres, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 135 days.

(21) Appl. No.: 16/424,452

(22) Filed: May 28, 2019

(65) Prior Publication Data
US 2020/0301838 A1   Sep. 24, 2020

Related U.S. Application Data

(60) Provisional application No. 62/822,777, filed on Mar. 22, 2019.

(51) Int. Cl.
*G06F 12/08* (2016.01)
*G06F 12/0831* (2016.01)
*G06F 11/07* (2006.01)
*G06F 12/0868* (2016.01)

(52) U.S. Cl.
CPC ........ *G06F 12/0833* (2013.01); *G06F 11/073* (2013.01); *G06F 12/0868* (2013.01)

(58) Field of Classification Search
CPC ............... G06F 11/073; G06F 12/0833; G06F 12/0868; G06F 12/0884
USPC .................................. 711/141, 168
See application file for complete search history.

(56) References Cited

U.S. PATENT DOCUMENTS

| | | | |
|---|---|---|---|
| 5,761,708 A * | 6/1998 | Cherabuddi | G06F 12/0884 710/57 |
| 6,098,115 A * | 8/2000 | Eberhard | G06F 13/161 710/21 |
| 6,226,722 B1 * | 5/2001 | Shippy | G06F 12/0897 711/168 |
| 2003/0033510 A1 * | 2/2003 | Dice | G06F 9/3834 712/235 |
| 2010/0268884 A1 | 10/2010 | Cummings et al. | |

(Continued)

*Primary Examiner* — Gary J Portka
(74) *Attorney, Agent, or Firm* — Renaissance IP Law Group LLP

(57) ABSTRACT

According to one general aspect, an apparatus may include a processor configured to issue a first request for a piece of data from a cache memory and a second request for the piece of data from a system memory. The apparatus may include the cache memory configured to temporarily store a subset of data. The apparatus may include a memory interconnect. The a memory interconnect may be configured to receive the second request for the piece of data from the system memory. The a memory interconnect may be configured to determine if the piece of memory is stored in the cache memory. The a memory interconnect may be configured to, if the piece of memory is determined to be stored in the cache memory, cancel the second request for the piece of data from the system memory.

17 Claims, 5 Drawing Sheets

(56) References Cited

U.S. PATENT DOCUMENTS

2014/0089592 A1\* 3/2014 Biswas ................ G06F 1/3225
                                                                    711/133
2016/0328322 A1    11/2016 Biswas et al.
2018/0267741 A1\*  9/2018 Blake .................... G06F 3/0653

\* cited by examiner

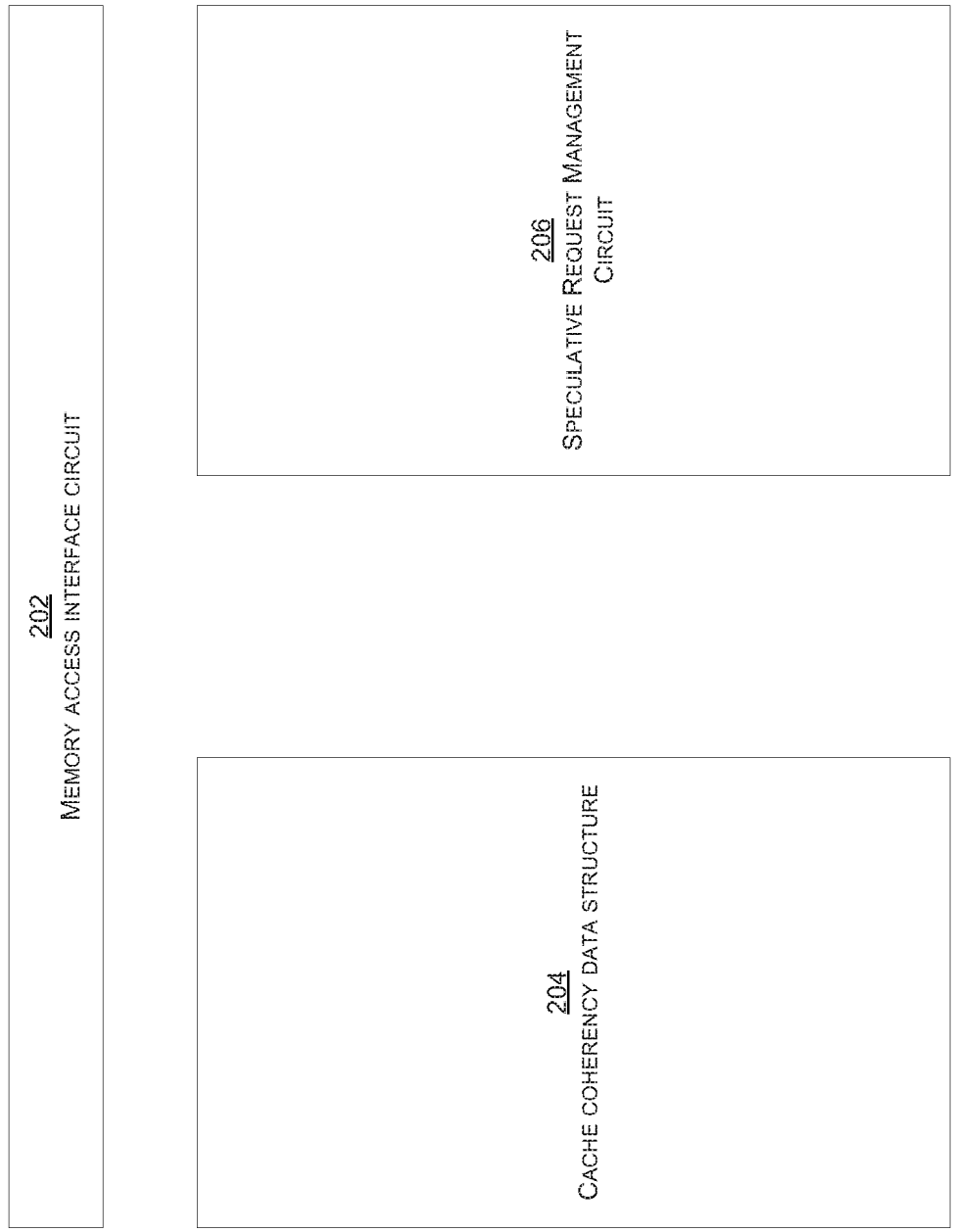

SPECULATIVE DRAM READ, IN PARALLEL WITH CACHE LEVEL SEARCH, LEVERAGING INTERCONNECT DIRECTORY

CROSS-REFERENCE TO RELATED APPLICATION

This application claims priority under 35 U.S.C. § 119 to Provisional Patent Application Ser. No. 62/822,777, entitled "SPECULATIVE DRAM READ, IN PARALLEL WITH CACHE LEVEL SEARCH, LEVERAGING INTERCONNECT DIRECTORY" filed on Mar. 22, 2019. The subject matter of this earlier filed application is hereby incorporated by reference.

TECHNICAL FIELD

This description relates to memory operations, and more specifically to speculative dynamic random access memory (DRAM) reads, in parallel with cache level search, leveraging an interconnect directory.

BACKGROUND

When specific data is shared by several caches and a processor modifies the value of the shared data, the change must be propagated to all the other caches which have a copy of the data. This change propagation prevents the system from violating cache coherency. The notification of data change can be done by bus snooping.

Bus snooping or bus sniffing is a scheme by which a coherency controller (snooper) in a cache monitors or snoops the bus transactions, and its goal is to maintain a cache coherency in distributed shared memory systems. A cache containing a coherency controller (snooper) is called a snoopy cache.

All the snoopers monitor every transaction on a bus. If a transaction modifying a shared cache block appears on a bus, all the snoopers check whether their caches have the same copy of the shared block. If a cache has a copy of the shared block, the corresponding snooper performs an action to ensure cache coherency. The action can be a flush or an invalidation of the cache block. It also involves a change of cache block state depending on the cache coherence protocol When a bus transaction occurs to a specific cache block, all snoopers must snoop the bus transaction. Then the snoopers look up their corresponding cache tag to check whether it has the same cache block. In most cases, the caches do not have the cache block since a well optimized parallel program does not share much data among threads. Thus, the cache tag lookup by the snooper is usually an unnecessary work for the cache that does not have the cache block. But the tag lookup disturbs the cache access by a processor and incurs additional power consumption.

One way to reduce the unnecessary snooping is to use a snoop filter. A snoop filter determines whether a snooper needs to check its cache tag or not. A snoop filter is a directory-based structure and monitors all coherent traffic in order to keep track of the coherency states of cache blocks. It means that the snoop filter knows the caches that have a copy of a cache block. Thus, it can prevent the caches that do not have the copy of a cache block from making the unnecessary snooping. There are two types of filters depending on the location of the snoop filter. One is a source filter that is located at a cache side and performs filtering before coherent traffics reach the shared bus. The other is a destination filter that is located at a bus side and blocks unnecessary coherent traffics going out from the shared bus. The snoop filter is also categorized as inclusive and exclusive. The inclusive snoop filter keeps track of the presence of cache blocks in caches. However, the exclusive snoop filter monitors the absence of cache blocks in caches. In other words, a hit in the inclusive snoop filter means that the corresponding cache block is held by caches. On the other hand, a hit in the exclusive snoop filter means that no cache has the requested cache block.

SUMMARY

According to one general aspect, an apparatus may include a processor configured to issue a first request for a piece of data from a cache memory and a second request for the piece of data from a system memory. The apparatus may include the cache memory configured to store a subset of data. The apparatus may include a memory interconnect. The a memory interconnect may be configured to receive the second request for the piece of data from the system memory. The a memory interconnect may be configured to determine if the piece of memory is stored in the cache memory. The a memory interconnect may be configured to, if the piece of memory is determined to be stored in the cache memory, cancel the second request for the piece of data from the system memory.

According to another general aspect, a system may include a plurality of processors, wherein a requesting processor is configured to issue a first request for a piece of data from a cache memory system and a second request for the piece of data from a system memory. The system may include the cache memory system, including, for each processor, a portion of the cache memory system associated with a respective processor. The system may include a memory interconnect. The memory interconnect may be configured to facilitate cache coherency between the processors. The memory interconnect may be configured to receive the second request for the piece of data from the system memory. The memory interconnect may be configured to determine if the piece of memory is stored in a portion of the cache memory system accessible by the requesting processor. The memory interconnect may be configured to, if the piece of memory is determined to be stored in the portion of the cache memory system, cancel the second request for the piece of data from the system memory.

According to another general aspect, an apparatus may include a memory access interface circuit configured to receive and send memory access requests and responses. The apparatus may include a cache coherency data structure configured to indicate of the contents of a cache memory. The apparatus may include a speculative request management circuit configured to: receive a speculative request, to a system memory, for a piece of data, determine if the piece of data is stored in, at least a portion of, the cache memory, and, if the piece of data is determined to be stored in the cache memory, cancel the speculative request.

The details of one or more implementations are set forth in the accompanying drawings and the description below. Other features will be apparent from the description and drawings, and from the claims.

A system and/or method for memory operations, and more specifically to speculative dynamic random access memory (DRAM) reads, in parallel with cache level search, leveraging an interconnect directory, substantially as shown in and/or described in connection with at least one of the figures, as set forth more completely in the claims.

BRIEF DESCRIPTION OF THE DRAWINGS

FIG. 2 is a block diagram of an example embodiment of a system in accordance with the disclosed subject matter.

Like reference symbols in the various drawings indicate like elements.

DETAILED DESCRIPTION

Figure 1A:
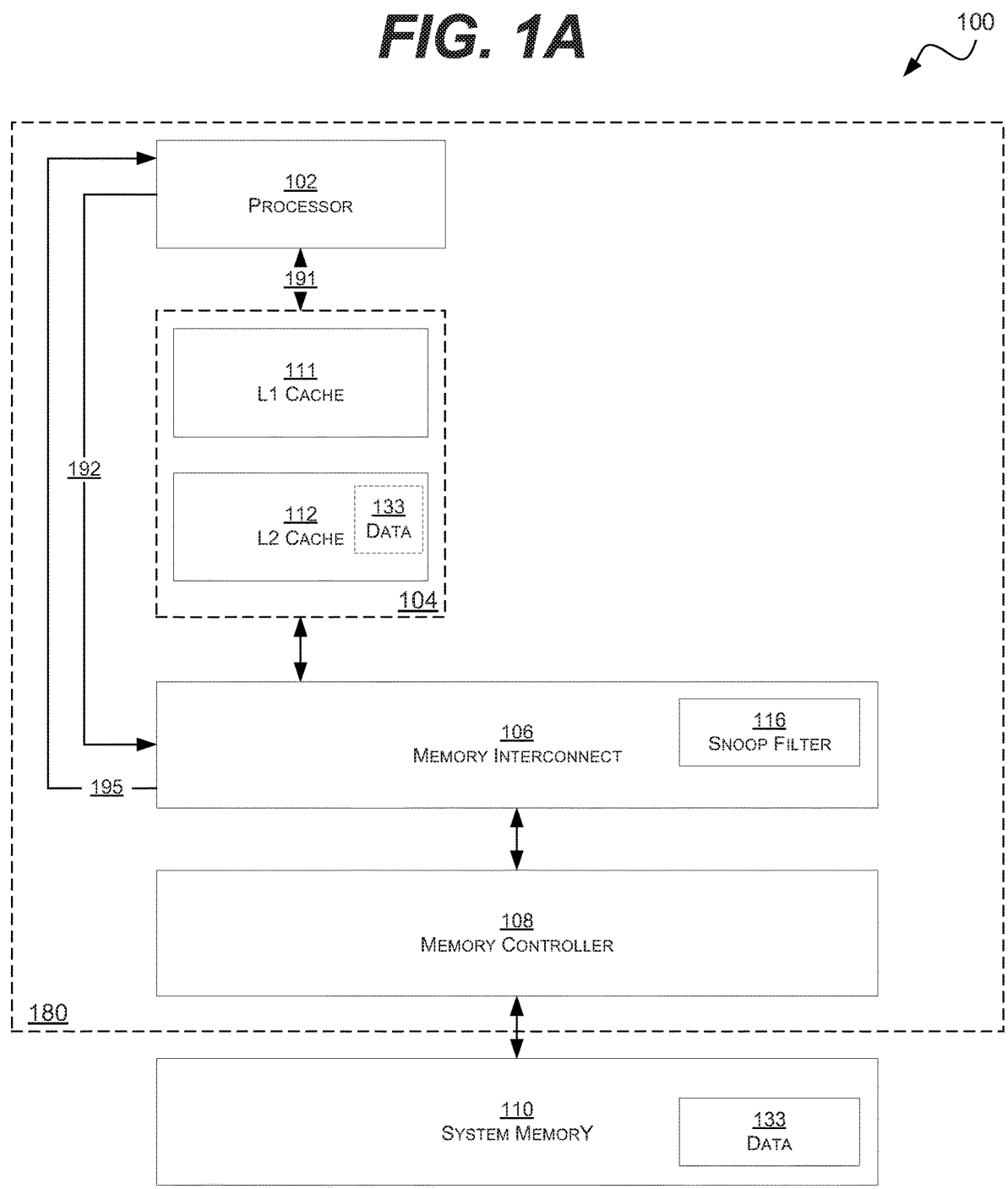
FIG. 1A is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1A is a block diagram of an example embodiment of a system 100 in accordance with the disclosed subject matter. In various embodiments, the system 100 may include a computing device, such as, for example, a laptop, desktop, workstation, system-on-a-chip (SOC), personal digital assistant, smartphone, tablet, and other appropriate computers or a virtual machine or virtual computing device thereof.

In the illustrated embodiment, the system 100 may include a processor 102. The processor 102 may be configured to execute one or more machine executable instructions or pieces of software, firmware, or a combination thereof. In the illustrated embodiment, the processor 102 may include a core, processing unit, or portion of a larger integrated circuit.

In the illustrated embodiment, the system 100 may include a memory cache circuit or system 104. The cache 104 may be configured to temporarily store data (e.g., data 133). In the illustrated embodiment, the cache 104 may include a level-1 (L1) cache 111 and a level 2 (L2) cache 112. In such an embodiment, the caches 111 and 112 may be hierarchal. In various embodiments, other cache levels may be included or may be removed from the cache memory 104. In various embodiments, a portion or cache level may include in the processor 102 (e.g., a level-0 (L0) cache). It is understood that the above is merely one illustrative example to which the disclosed subject matter is not limited.

In the illustrated embodiment, the system 100 may include a memory interconnect 106. In various embodiments, the memory interconnect 106 may connect and/or manage a plurality of cache systems 104. While absent in this simplified illustration, such a plurality may exist in other embodiments. In such an embodiment, the memory interconnect 106 may facilitate cache coherency.

In the illustrated embodiment, the system 100 may include a memory controller circuit 108. The memory controller 108 may be configured to interface with the system memory 110, and may transmit and receive messages between the system memory 110 (or another intermediate circuit) and the processor 102 (and its intermediate circuits, such as, the memory interconnect 106, etc.).

In the illustrated embodiment, the system 100 may include a system memory 110. The system memory 110 may be configured to store data (e.g., data 133). In various embodiments, the system memory 110 may include dynamic random access memory (DRAM). Although, it is understood that the above is merely one illustrative example to which the disclosed subject matter is not limited. In various embodiments, volatile and/or non-volatile memory technologies may be employed. Generally, the system memory 110 may store a copy of each piece of data stored in the cache 104, although the copy may be old or out of date (e.g., a write to the cache may not have propagated to the system memory yet).

In various embodiments, the processor 102, cache 104, memory interconnect 106, and the memory controller 108 may be include in an integrated circuit or processing unit 180 (e.g., a system-on-a chip (SOC)). In various embodiments, the system memory 110 may be included or integrated with the other components. It is understood that the above is merely one illustrative example to which the disclosed subject matter is not limited.

In the illustrated embodiment, the processor 102 may wish to access a piece of data (e.g., data 133). To do so, traditionally the processor 102 would issue a memory access requests (e.g., a read request, a write request). The system 100 would examine the cache 104 of the data, searching the closest tier or level (e.g., L1) first before proceeding to the next level (e.g., L2). If the data was still not found, then a request for the data would be made to the system memory 110. This series of searches wastes time, especially when the data is critical and latency is important.

In the illustrated embodiment, the processor 102 may issue not one request for data, but two, substantially in parallel. In the illustrated embodiment, the processor 102 may issue a first request 191 for the desired piece of data from the cache 104 (as is traditionally done). However, in various embodiments, the processor 102 may also issue a second request 192 for the desired piece of data from the system memory 110 (which is routed through the memory interconnect 106 and memory control 108).

In various embodiments, the second request 192 may be allowed to occur naturally or as a traditional memory access to the system memory 110 would, and return the data 133. However, if the cache request 191 has also returned the data 133, the two versions of data 133 may causes problems. The cached and system-level versions may not be coherent (i.e., have different values), read-after-write ordering may be complex, and the completed system memory request 192 used system resources needlessly. As such, allowing the system-level memory access to occur without further analysis may not be desirable.

In the illustrated embodiment, the processor 102 may issue the second request 192 speculatively. In such an embodiment, the second request 192 may include a bit or a flag to indicate that the second request 192 is not a normal (i.e., non-speculative or traditional) memory access, but a special, speculative one that requires non-traditional handling and processing.

In the illustrated embodiment, the second request 192 may be received by the memory interconnect 106. This is compared to some embodiments where only non-speculative second requests are used which may bypass the memory interconnect 108 and go to the memory control 108 instead. In the illustrated embodiment, the second request 192 may be routed to the memory interconnect 106 because the memory interconnect 106 has access to information needed to process the speculative nature of the second request 192.

In the illustrated embodiment, the memory interconnect 106 may include a snoop filter directory 116 and/or snoop cache (not shown but described above). In such an embodiment, the snoop filter 106 (or similar data structure) may be configured to indicate what data 133 is currently stored in the cache 104.

In such an embodiment, instead of completing the second request 192 to the system memory 110, regardless of whether or not the first request 191 to the cache 104 would succeed, the memory interconnect 106 may predict or determine if the first request 191 would or is likely to succeed.

In various embodiments, the memory interconnect 10 may do this by determining if the requested piece of data (e.g., data 133) is included or stored in the cache 104, wherein "stored" includes the idea that the data has also been updated or modified in the requestor processor's cache. If it is, the first request 191 may be determined or predicted to succeed. If not, the first request 191 may be determined or predicted to fail.

In various embodiments, this determination may be made by examining or using the snoop filter directory 116 or the cache coherency mechanisms/circuits of the memory interconnect 106. In various embodiments, the snoop filter directory 116 may be configured to be conservative or pessimistic. In such an embodiment, the snoop filter directory 116 may be allowed to incorrectly indicate that a piece of data is in the cache 104 (i.e., a false positive), but not allowed to incorrectly indicate that a piece of data is not in the cache 104 (i.e., a false negative). In such an embodiment, the memory interconnect 106 will not be configured to only incorrectly predict that the second request 192 should be cancelled, never that the second request 192 should proceed. In such an embodiment, the memory interconnect 106 may be biased or weighted towards a manageable failure of prediction.

In various embodiments, if the first request 191 is determined or predicted to fail, the memory interconnect 106 may allow the second request 192 to the system memory 110 proceed. The second request 192 may retrieve the data 133 from the system memory 110 and return it to the processor 102. In such an embodiment, since the first request 191 had failed, there will not be a second version of the data 133 to conflict with the version of the system memory 110, nor will the resources used to retrieve the data from system memory 110 have been wasted. Instead, the speculative second request 192 will have retrieved the data with a lower latency than the traditional "cache failure-system request" scheme, as described above.

Conversely, if the first request 191 is determined or predicted to be a success (i.e., the cache 104 is believed to include the data 133), the memory interconnect 106 may cancel the second request 192 and not allow it to proceed to the system memory 110. In such an embodiment, the memory interconnect 106 may prevent the second request 106 from proceeding to the memory controller 108 or may instruct the memory controller 108 to not forward the request 192.

In such an embodiment, by cancelling the second request 192 the processor 102 may not have the issues described above with multiple versions of the same data (from both the cache 104 and the system memory 110). Further, the resources expended on retrieving the data from the system memory 110 may not be spent and wasted. It is understood that the above are merely a few illustrative examples to which the disclosed subject matter is not limited.

In various embodiments, the memory interconnect 106 may be configured to ensure that there will be no system memory 110 response data when it is not safe for coherency reasons. Hence when the system memory 110 response data is received, it may be directly forwarded to processor 102, bypassing the cache 104, without any further checking in cache 104.

In various embodiments, the memory interconnect 106 may also be configured to prevent or cancel the speculative second request 192 if the memory interconnect 106, system memory 110, and/or cache 104 queues (or other system resources) are heavily loaded. In such an embodiment, the second request 192 may be delayed or throttled if the system 100 is heavy taxed.

Further, in various embodiments, the processor 102 may be configured to only issue the speculative second request 192 when the memory access is considered critical or where latency is of great import. In such an embodiment, this may aid in the management of system resources. In some embodiments, the threshold for issuing the speculative second request 192 may be dynamic, such that request 192 is made more often when system resources are abundant. In another embodiment, the processor 102 may only issue a speculative second request 192 if it predicts a cache miss. In yet another embodiment, the processor 102 may issue the second request 192 as a matter of course of all, or most, memory accesses. It is understood that the above are merely a few illustrative examples to which the disclosed subject matter is not limited.

In the illustrated embodiment, if the memory interconnect 106 decides to cancel the second request 192, it may issue a cancellation response 195. In such an embodiment, the cancellation response 195 may inform the requesting processor 102 that the second request 192 has been cancelled. In such an embodiment, the processor 102 may no longer wait or allocate resources to the anticipated return of data due to the second request 192. In another embodiment, if the memory interconnect 106 incorrectly cancelled the second request 192 (e.g., due to a mis-prediction or false positive), the cancellation response 195 may inform the processor 102 that a third request (shown in FIG. 1B) may be needed. It is understood that the above is merely one illustrative example to which the disclosed subject matter is not limited.

In the illustrated embodiment, the first request 191 to the cache 104 completes normally or traditionally. In such an embodiment, the first request 191 may determine if the data is in the cache 104. The first request 191 causes each cache layer, tier, or level (e.g., L1 cache 111, L2 cache 112, etc.) to be examined in turn, until the data is either found or there are no more levels in the cache to examine. In such an embodiment, the first request 191 may return either a successful response or a failure response (neither shown). In various embodiments, when the second request 192 is issued in parallel with the first request 192, the first request 191 may (in the worst case) terminate at the last cache tier searched. In another embodiment, the first request 191 may be issued to the system memory 110, as is described in the traditional case.

Figure 1B:
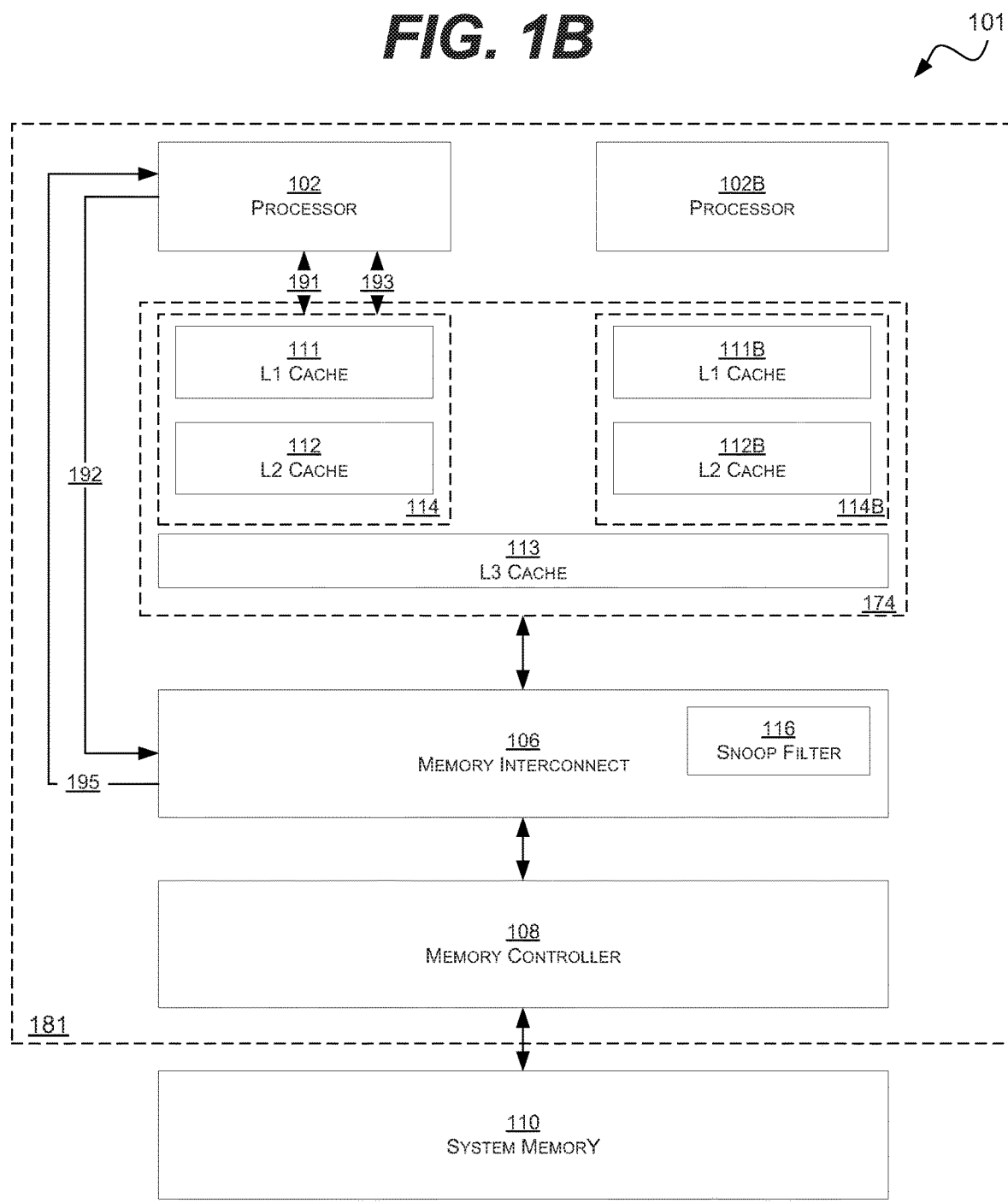
FIG. 1B is a block diagram of an example embodiment of a system in accordance with the disclosed subject matter.

FIG. 1B is a block diagram of an example embodiment of a system 101 in accordance with the disclosed subject matter. In various embodiments, the system 100 may include a computing device, such as, for example, a laptop, desktop, workstation, system-on-a-chip (SOC), personal digital assistant, smartphone, tablet, and other appropriate computers or a virtual machine or virtual computing device thereof. In various embodiments, the system 101 may illustrate a multi-core version of the system 100 of FIG. 1A.

In such an embodiment, the system 101 may include the processor 102, the cache system 174 (similar to cache system 104), the memory interconnect 106, the memory controller 108, and the system memory 110, as described above. In various embodiments, the integrated circuit 181 may include the processor 102, the cache system 174, the memory interconnect 106, the memory controller 108, and processor 102B. It is understood that the above is merely one illustrative example to which the disclosed subject matter is not limited.

In the illustrated embodiment, the system 101 may include a plurality of processors, processing units, or cores (represented by the addition of processor 102B). In such an embodiment, each processor 102 may associated with its own respective portion of the cache system 174.

In the illustrated embodiment, the cache system 174 may include a L1 caches 111 and 111B, the L2 caches 112 and 112B, and the level-3 (L3) cache 113. In such an embodiment, the caches 111 and 112 (grouped as portion 114) may be for the exclusive use of the processor 102. Whereas the caches 111B and 112B (grouped as portion 114B) may be for the exclusive use of the processor 102B. In the illustrated embodiment, the cache 113 may be for their unified or shared use. In another embodiment, the cache 113 may not exist. It is understood that the above are merely a few illustrative examples to which the disclosed subject matter is not limited.

In the illustrated embodiment, when processing the speculative second request 192, the memory interconnect 106 may be configured to only check for the existence of the requested data in the caches associated with the requesting processor (e.g., processor 102). In such an embodiment, the caches 111, 112, and even 113 may be examined (via the snoop filter 116 or other cache coherency structure), but not caches 111B and 112B (which are associated with non-requesting processor 102B). Likewise, had processor 102B been the requesting processor, caches 111B, 112B, and 113 may have been examined.

In various embodiments, once the caches associated with the requesting processor (e.g., processor 102) are examined and found lacking, the other caches (e.g., caches 11B and 112B) may be examined. In such an embodiment, the other caches (e.g., caches 11B and 112B) may include the data, and due to a snoop operation may return the desired data, thus making the speculative second request 192 to the system memory 110 unnecessary. In yet another embodiment, the only data presence in the caches of the requestor (e.g., caches 111, 112, and 113) may examined for generating the speculative cancel response 195.

As described above, in various embodiments, the memory interconnect 106 may cancel the second request 192 and issue a cancellation response 195 to the requesting processor 102. However, as described above, sometimes the memory interconnect 106 may be wrong about the data existing in the cache 174. In such an embodiment, the first request 191 may eventually fail. In such an embodiment, the processor 102 may be configured to issue a non-speculative third request 193 to the system memory 110 for the desired data. In various embodiments, the non-speculative third request 193 may be routed to the cache 174, to avoid the possibility that the data was brought into the cache system 174 (e.g., in cache 113) after the request 191 was issued. In another embodiment, the non-speculative third request 193 may be routed to the memory interconnect 106 or the memory controller 108 (as the memory interconnect 106 does not gate or cancel non-speculative requests). In various embodiments, the non-speculative third request 193 may include a flag or bit that indicates that it is non-speculative and may not be canceled as described herein.

FIG. 2 is a block diagram of an example embodiment of a system 200 in accordance with the disclosed subject matter. In various embodiments, the system 200 may include or be part of the memory interconnect circuit described above.

In various embodiments, the system 200 may include a memory access interface circuit 202 configured to receive and send memory access requests and responses. In various embodiments, the memory access interface circuit 202 may be configured to receive the speculative memory access request, as described above. In another embodiment, the memory access interface circuit 202 may be configured to send the cancellation response message, as described above. In yet another embodiment, the memory access interface circuit 202 may be configured to receive the non-speculative memory access request, as described above. It is understood that the above are merely a few illustrative examples to which the disclosed subject matter is not limited.

In various embodiments, the system 200 may include a cache coherency data structure 204. In various embodiments, the cache coherency data structure 204 may be able to indicate whether or not a piece of data is currently stored in a cache system. In various embodiments, this cache coherency data structure 204 may be accessed or queried when determining if a speculative memory access should be allowed to proceed.

In various embodiments, the cache coherency data structure 204 may include a snoop filter directory, as described above. In another embodiment, the cache coherency data structure 204 may include a cache tag or circuit to access the cache tags of a cache system. In yet another embodiment, a directory-based cache coherence mechanism may be employed. It is understood that the above is merely one illustrative example to which the disclosed subject matter is not limited.

In various embodiments, the system 200 may include a speculative request management circuit 206. In various embodiments, the speculative request management circuit 206 may be configured to gate or determine whether a speculative request would be a proper or condoned use of system resources (e.g., cycles, bandwidth, etc.). As described above, in such an embodiment, the speculative request management circuit 206 may be configured to determine if the requested piece of data is already stored in the cache or if a substantially parallel memory access to the cache system is likely to be successful. In such an embodiment, the determination may be made utilizing the cache coherency data structure 204.

In various embodiments, if the speculative request management circuit 206 determines that the speculative request is likely to be redundant, it may cancel or otherwise impede the speculative request. In such an embodiment, if the speculative request management circuit 206 determines that the speculative request is likely to be redundant, it may allow the speculative request to proceed.

Figure 3:
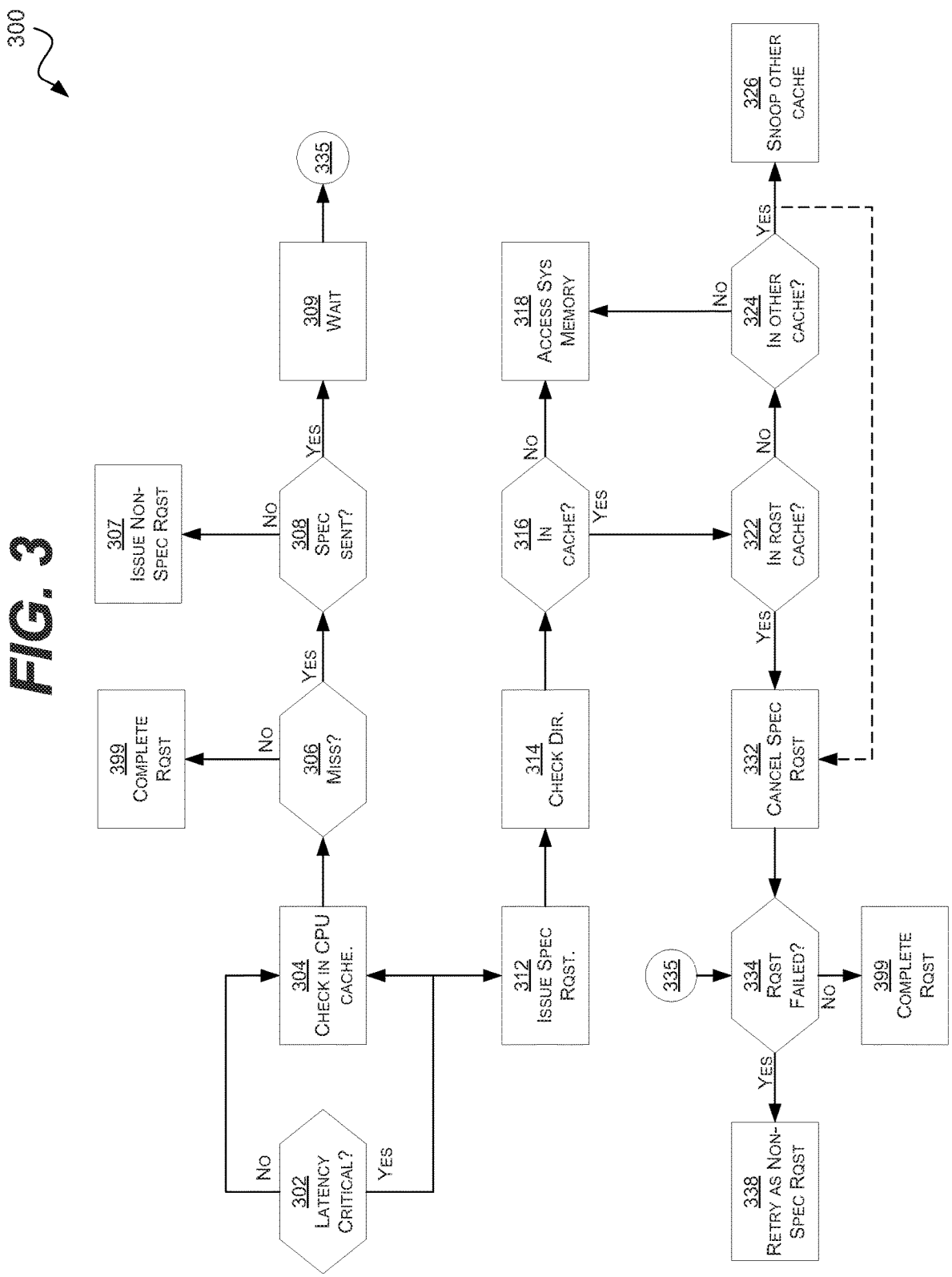
FIG. 3 is a flowchart of an example embodiment of a technique in accordance with the disclosed subject matter.

FIG. 3 is a flowchart of an example embodiment of a technique 300 in accordance with the disclosed subject matter. In various embodiments, the technique 300 may be used or produced by the systems such as those of FIGS. 1A, 1B, and 2.

Although, it is understood that the above are merely a few illustrative examples to which the disclosed subject matter is not limited. It is understood that the disclosed subject matter is not limited to the ordering of or number of actions illustrated by technique 300.

Block 302 illustrates that, in one embodiment, the requesting processor or the initiating circuit may determine whether or not the memory access is a latency critical or otherwise important access, as described above. Block 302 may also include additional prediction logic to determine whether to issue the speculative request. The decision need not be solely based upon latency. If not, a single memory request may be made to the cache. If so, two, substantially parallel memory requests may be made to both the cache and the system memory, as described above.

Block 304 illustrates that, in one embodiment, that, as part of the first cache-base request, a check may be made to determine whether or not the data is actually in the cache system. Block 306 illustrates that, in one embodiment, a cache hit or miss may occur.

Block 399 illustrates that, in one embodiment, if a cache hit occurred, the first cache-based request may be used to complete the memory access.

Block 308 illustrates that, in one embodiment, if a cache miss occurred, a determination may be made as to whether a speculative second request was already made (per Block 302). Block 307 illustrates that, in one embodiment, if a speculative request was not already made, a non-speculative request to system memory may be made, as described above. Block 309 illustrates that, in one embodiment, if a speculative request was already made, the system may wait for the results of that request. In various embodiments, if the speculative request is eventually (and incorrectly) cancelled, the steps of Blocks 334 may occur. Connector 335 connects Blocks 309 and 334.

Block 312 illustrates that, in one embodiment, a speculative second request may be issued to the system memory, via the memory interconnect, as described above. Blocks 314 and 316 illustrate that, in one embodiment, the memory interconnect may check the snoop filter directory or other cache coherency structure to determine if the requested data is currently stored in the cache system.

Block 318 illustrates that, in one embodiment, if the requested data is not in the cache system, the memory access may proceed to the system memory, as described above. In such an embodiment, the memory request may be fulfilled from the system memory.

Block 322 illustrates that, in one embodiment, if the data is in the cache system, a determination may be made as how to best provide that data to the requesting processor. Specifically, it may be determined whether or not the data is stored in a cache. Further testing may include, in various embodiments, whether or not the data is stored in an acceptable state; e.g., not the Invalid state of the MESI (Modified-Exclusive-Shared-Invalid) protocol.

Block 324 illustrates that, in one embodiment, if the data is not in a cache associated with the requesting processor, a determination may be made as to whether it actually is in a cache associated with another of a multi-processor system. Block 324 illustrates that, in one embodiment, if the result of Block 316 was incorrect or too limited, and the data is not in another processor's cache either, the speculative request may proceed (Block 318). Otherwise, if the data s in another cache, Block 326 illustrates that, in one embodiment, the data may be made available via snooping the other cache.

Block 332 illustrates that, in one embodiment, that if the data is available in the cache and it is not desirable to get it via the system memory (Block 318), then the speculative request may be cancelled, as described above. As described above, this may include sending a cancellation response back to the requesting processor. In a preferred embodiment, there may be no link between Blocks 324 and 332. In such an embodiment, if desired data is not in the requestor cache and in other cache, the interconnect may supply the data via snooping and may not return cancel response to the processor. Making the processor retrying unnecessary.

Block 334 illustrates that, in one embodiment, at some later time, the first cache-based request may complete. Block 399 illustrates that, in one embodiment, if a cache hit occurred, the first cache-based request may be used to complete the memory access. Block 338 illustrates that, in one embodiment, on the other hand, if the memory interconnect was wrong in cancelling speculative request (Block 332) and the data was not actually in the cache (Blocks 316 and 306), a non-speculative request may be attempted, as described above. In such an embodiment, the non-speculative request may be issued to the system memory.

Figure 4:
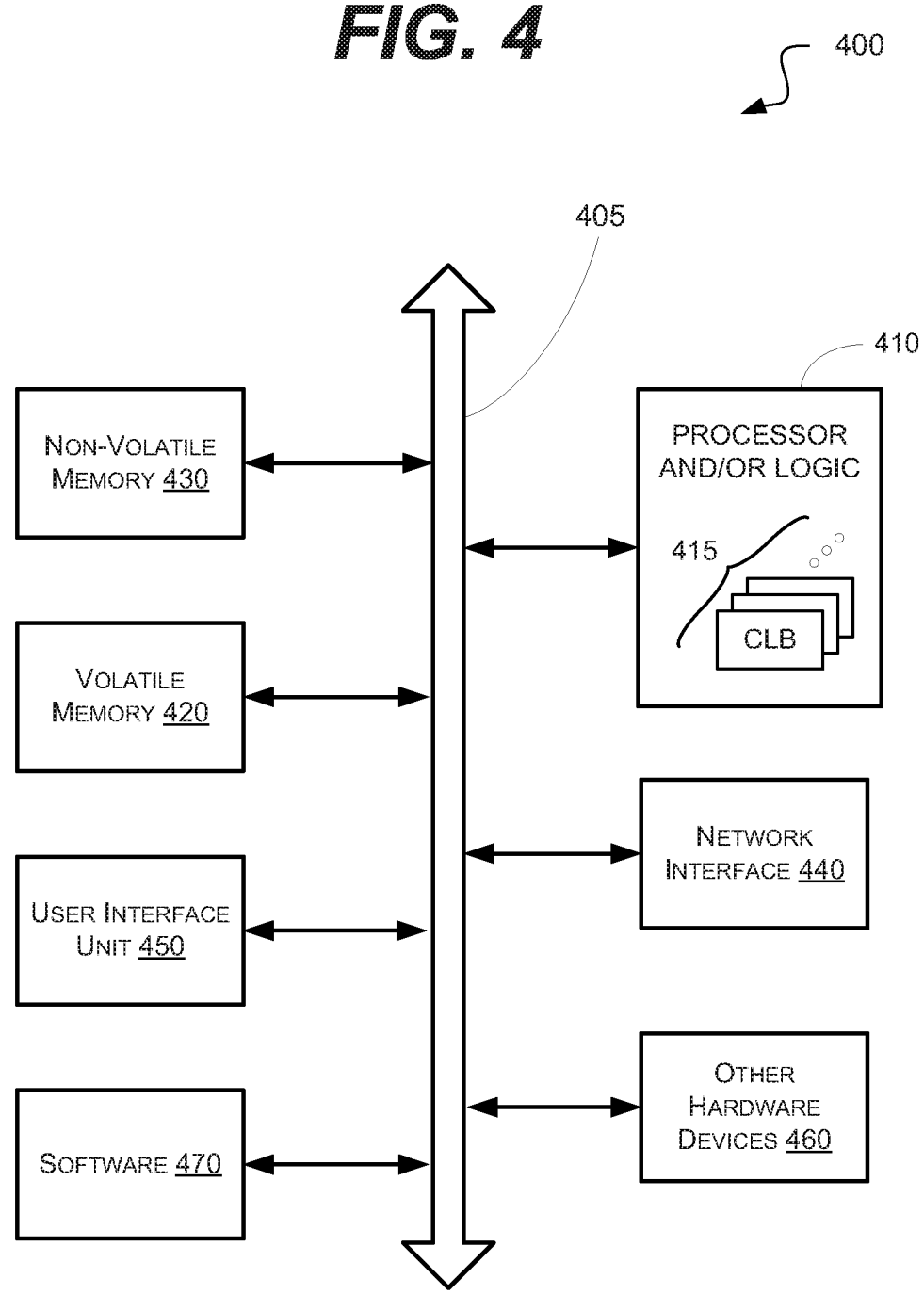
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus, comprising:
a processor that issues a first request for a piece of data from a cache memory and a second request for the piece of data from a system memory;
the cache memory storing a subset of data; and
a memory interconnect that:
receives the second request for the piece of data from the system memory,
determines whether the piece of data is stored in the cache memory,
cancels the second request for the piece of data from the system memory based on the piece of data being determined to be stored in the cache memory, and
cancels the second request for the piece of data from the system memory based on the second request arriving at the memory interconnect before a write request associated with the piece of data and in which the second request is younger than the write request.

2. The apparatus of claim 1, wherein the processor includes a speculative flag in the second request for the piece of data from a system memory.

3. The apparatus of claim 1, wherein the memory interconnect
cancels the second request for the piece of data from the system memory by issuing a cancel response message to the processor based on the piece of data being determined to be stored in the cache memory.

4. The apparatus of claim 1, wherein the memory interconnect determines whether the piece of data is stored in the cache memory by:
maintaining a snoop filter directory of cache memory contents; and
checking contents of the snoop filter directory to determine whether the requested piece of data is included in the cache memory.

5. The apparatus of claim 4, wherein the memory interconnect maintains a snoop filter directory of cache memory contents such that the snoop filter directory may include false positive results but not false negative results.

6. The apparatus of claim 1, wherein, in response to receiving both a failure of the first request and a cancellation of the second request, the processor issues
a third request for the piece of data from the system memory.

7. The apparatus of claim 1, wherein, when issued the second request, the memory interconnect prevents an access request to the system memory for a piece of data already stored in the cache memory.

8. A system comprising:
a plurality of processors, a requesting processor of the plurality of processors issuing a first request for a piece of data from a cache memory system and a second request for the piece of data from a system memory;
the cache memory system, including, for each processor of the plurality of processors, a portion of the cache memory system associated with a respective processor; and
a memory interconnect that:
facilitates cache coherency between the processors,
receives the second request for the piece of data from the system memory,
determines whether the piece of data is stored in a portion of the cache memory system accessible by the requesting processor,
cancels the second request for the piece of data from the system memory based on the piece of data being determined to be stored in the portion of the cache memory system, and
cancels the second request for the piece of data from the system memory based on the second request arriving at the memory interconnect before a write request associated with the piece of data and in which the second request is younger than the write request.

9. The system of claim 8, wherein the requesting processor includes a speculative flag in the second request for the piece of data from a system memory.

10. The system of claim 8, wherein the memory interconnect cancels
the second request for the piece of data from the system memory by issuing a cancel response message to the requesting processor based on the piece of data being determined to be stored in the portion of the cache memory system.

11. The system of claim 8, wherein the memory interconnect determines whether the piece of data is stored in the portion of the cache memory system by:
maintaining a snoop filter directory of cache memory contents; and
checking contents of the snoop filter directory to determine whether the requested piece of data is included in the portion of the cache memory system.

12. The system of claim 11, wherein the memory interconnect maintains a snoop filter directory of cache memory contents such that the snoop filter directory may include false positive results but not false negative results.

13. The system of claim 8, wherein the requesting processor issues
a third request for the piece of data from the system memory in response to receiving both a failure of the first request and a cancellation of the second request.

14. The system of claim 8, wherein, when issued the second request, the memory interconnect prevents an access request to the system memory for a piece of data already stored in the cache memory system.

15. An apparatus comprising:
a memory access interface circuit that receives and sends memory access requests and responses;
a cache coherency data structure that indicates contents of a cache memory; and
a speculative request management circuit that:
receives a speculative request, to a system memory, for a piece of data,
determines whether the piece of data is stored in, at least a portion of, the cache memory, and
cancels the speculative request based on the piece of data being determined to be stored in the cache memory,
the memory access interface circuit canceling the speculative request for the piece of data based on the speculative request arriving at the memory access interface circuit before a write request associated with the piece of data and in which the speculative request is younger than the write request.

16. The apparatus of claim 15, wherein the speculative request management circuit cancels
the speculative request by, at least in part, issuing a cancellation request message to a requesting device.

17. The apparatus of claim 15, wherein the speculative request management circuit determines whether
the piece of data is stored in, at least a portion of, the cache memory, by accessing the cache coherency data structure.

* * * * *